United States Patent [19]
Matsuoka et al.

[11] Patent Number: 5,965,170
[45] Date of Patent: Oct. 12, 1999

[54] CAST MOLDING APPARATUS

[75] Inventors: Yasuhiko Matsuoka, Kanagawa; Tarou Kita, Tokyo, both of Japan

[73] Assignee: Shonan Design Co., Ltd., Kanagawa, Japan

[21] Appl. No.: 08/948,031

[22] Filed: Oct. 9, 1997

[30] Foreign Application Priority Data

Oct. 24, 1996 [JP] Japan .................................... 8-299588

[51] Int. Cl.$^6$ ............................ B29C 33/34; B29C 35/08
[52] U.S. Cl. .................. 425/174.4; 425/175; 425/405.1; 425/453
[58] Field of Search ..................................... 425/253, 259, 425/405.1, 175, 174.4, 453; 164/256

[56] References Cited

U.S. PATENT DOCUMENTS

| | | | |
|---|---|---|---|
| 3,565,156 | 2/1971 | Vollmer et al. | 164/256 |
| 3,700,026 | 10/1972 | Adachi et al. | 164/256 |
| 3,882,792 | 5/1975 | McIntier | 425/453 |
| 4,658,881 | 4/1987 | Sasaki | 164/256 |
| 4,961,888 | 10/1990 | Brown | 425/453 |
| 5,040,964 | 8/1991 | Oppawsky et al. | 425/174.4 |
| 5,147,660 | 9/1992 | Steindorf | 425/405.1 |
| 5,503,215 | 4/1996 | Betz et al. | 164/256 |

FOREIGN PATENT DOCUMENTS

| | | | |
|---|---|---|---|
| 1-214411 | 8/1989 | Japan | 425/405.1 |
| 3-114711 | 5/1991 | Japan . | |
| 3-213314 | 9/1991 | Japan | 425/174.4 |
| 4-83611 | 3/1992 | Japan . | |
| 4-115916 | 4/1992 | Japan | 425/174.4 |
| 4-122615 | 4/1992 | Japan . | |
| 5-8008 | 1/1993 | Japan | 164/256 |
| 5-31740 | 2/1993 | Japan | 425/405.1 |

*Primary Examiner*—Robert Davis
*Attorney, Agent, or Firm*—Paul A. Guss

[57] ABSTRACT

A molding apparatus includes a molding die having a cavity therein corresponding to the outer shape of a product to be reproduced, and a cast molding device for pouring an ultraviolet curable liquid resin into a cavity of the molding die. An ultraviolet light irradiating device is provided for irradiating ultraviolet light from the outside of the molding die, wherein the ultraviolet curable liquid resin in the interior of the molding die becomes hardened. A transport mechanism is provided for conveying the molding die between the cast molding device and the ultraviolet light irradiating device. Accordingly, an operator is not required to lift and carry the molding die, and the die can be swiftly and easily conveyed by means of the transport mechanism.

16 Claims, 13 Drawing Sheets

F I G. 8
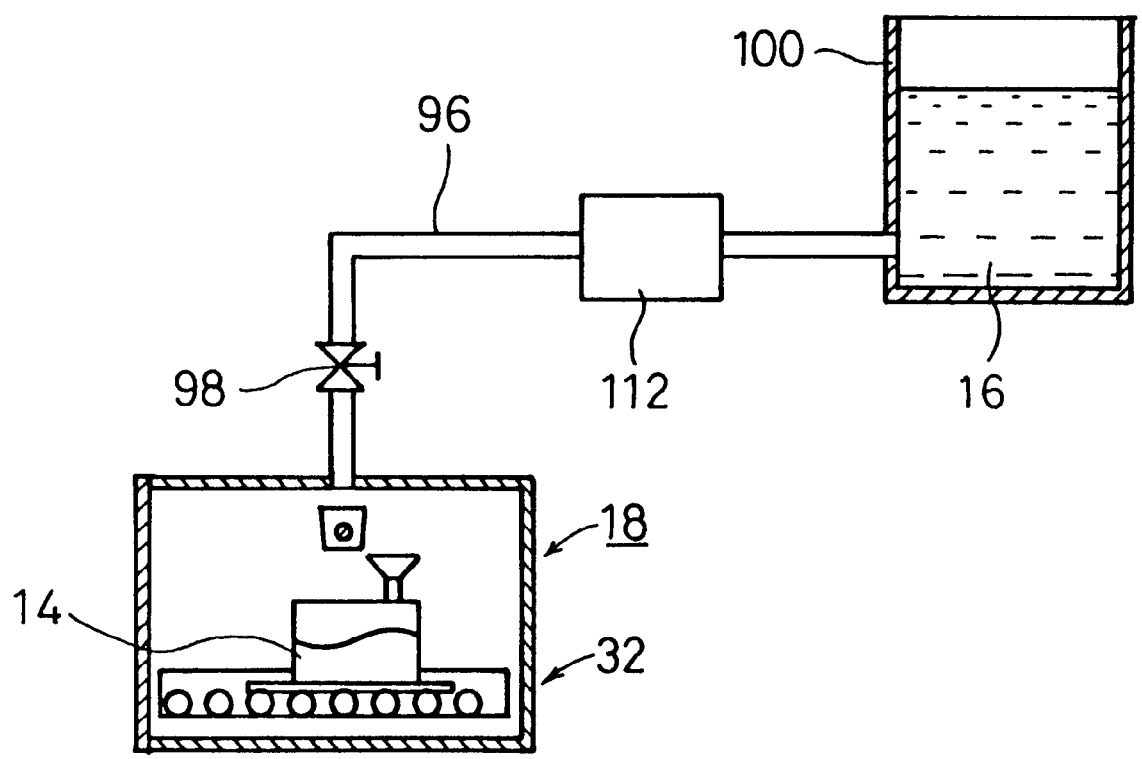

CAST MOLDING APPARATUS

BACKGROUND OF THE INVENTION

1. Field of the Invention

The present invention concerns a cast molding apparatus by which a molded article is obtained by infusing (pouring) a liquid resin into a mold, wherein the resin is then hardened by exposure to ultraviolet radiation.

2. Description of the Related Art

Generally speaking, in processes for developing new products, in order to undertake various confirmations of the appearance and so forth of the product, reproductions of the product must first be manufactured. For example, a method of vacuum cast molding in which silicon rubber is used as a forming matrix has been widely known. More specifically, first a master model, which is a prototype of the molded product, is manufactured, and the master model is then embedded inside a liquid silicon rubber composite which is hardened by being subjected to additional applied heating. Subsequently, after the silicon rubber composite article has hardened, the master model is removed therefrom and a heat-curable resin is poured into the mold, wherein the heat curable resin becomes hardened under the application of applied heat, thereby obtaining the reproduced article.

Incidentally, it is desirable to manufacture such reproduced articles within a short time period. However, the hardening of heat-curable resins requires considerable time. Therefore, for example, a manufacturing method is known according to Japanese Laid-Open Patent Publication 3-11471, wherein according to this reference, an ultraviolet curable liquid resin (an epoxy resin or an acrylic reactant resin) is infused into a mold made from a transparent RTV silicon composite (curable at room temperature), thereby obtaining a product which is hardened by irradiation with ultraviolet rays.

However, the molding device which is put to use in the above technique ordinarily is equipped for use only under a vacuum. For example, after the ultraviolet curable liquid resin is infused into the mold inside of a vacuum chamber, an operator must then transfer the mold to an ultraviolet irradiation exposure apparatus. Furthermore, after the hardening treatment has been performed using the ultraviolet irradiation apparatus, the operator must then extract the hardened product from the mold, and must again transport the mold back into the vacuum chamber. Thus, operations for transporting the mold add considerable complications, in addition to time expenditures, thus pointing to the problem that the molded product cannot be produced efficiently within a reasonably short time period.

SUMMARY OF THE INVENTION

It is a general object of the invention to provide a cast molding apparatus which is capable of efficiently and easily obtaining a molded product which is formed from an ultraviolet curable resin.

The above and other objects, features and advantages of the present invention will become more apparent from the following descriptions when taken in conjunction with the accompanying drawings in which preferred embodiments of the present invention are shown by way of illustrative example.

BRIEF DESCRIPTION OF THE DRAWINGS

FIG. 8 is a partial structural view of a cast molding apparatus according to a third embodiment of the present invention.

DETAILED DESCRIPTION OF THE PREFERRED EMBODIMENTS

Figure 1:
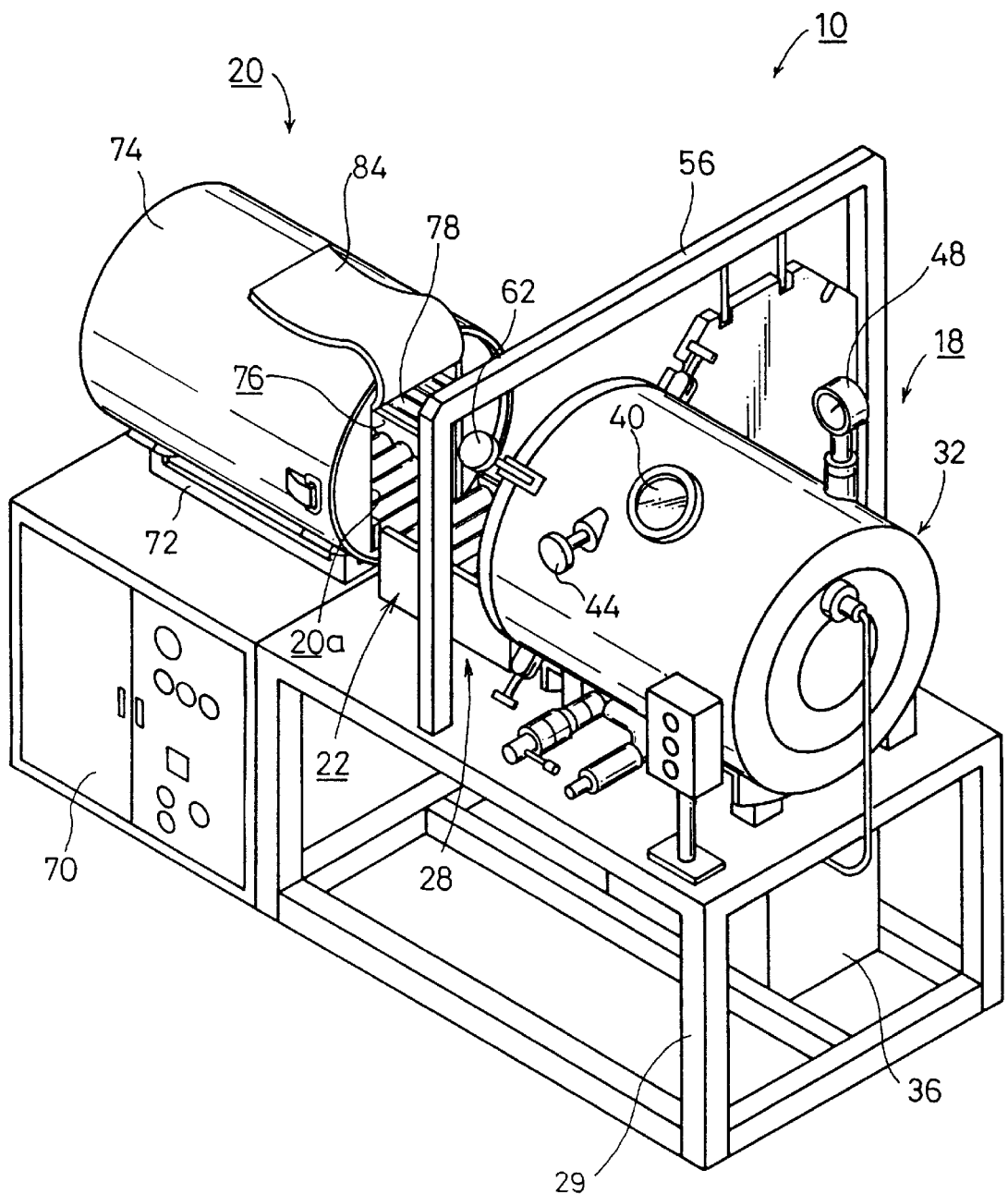
FIG. 1 is an explanatory perspective view of a cast molding apparatus according to the first embodiment of the present invention.
Figure 2:
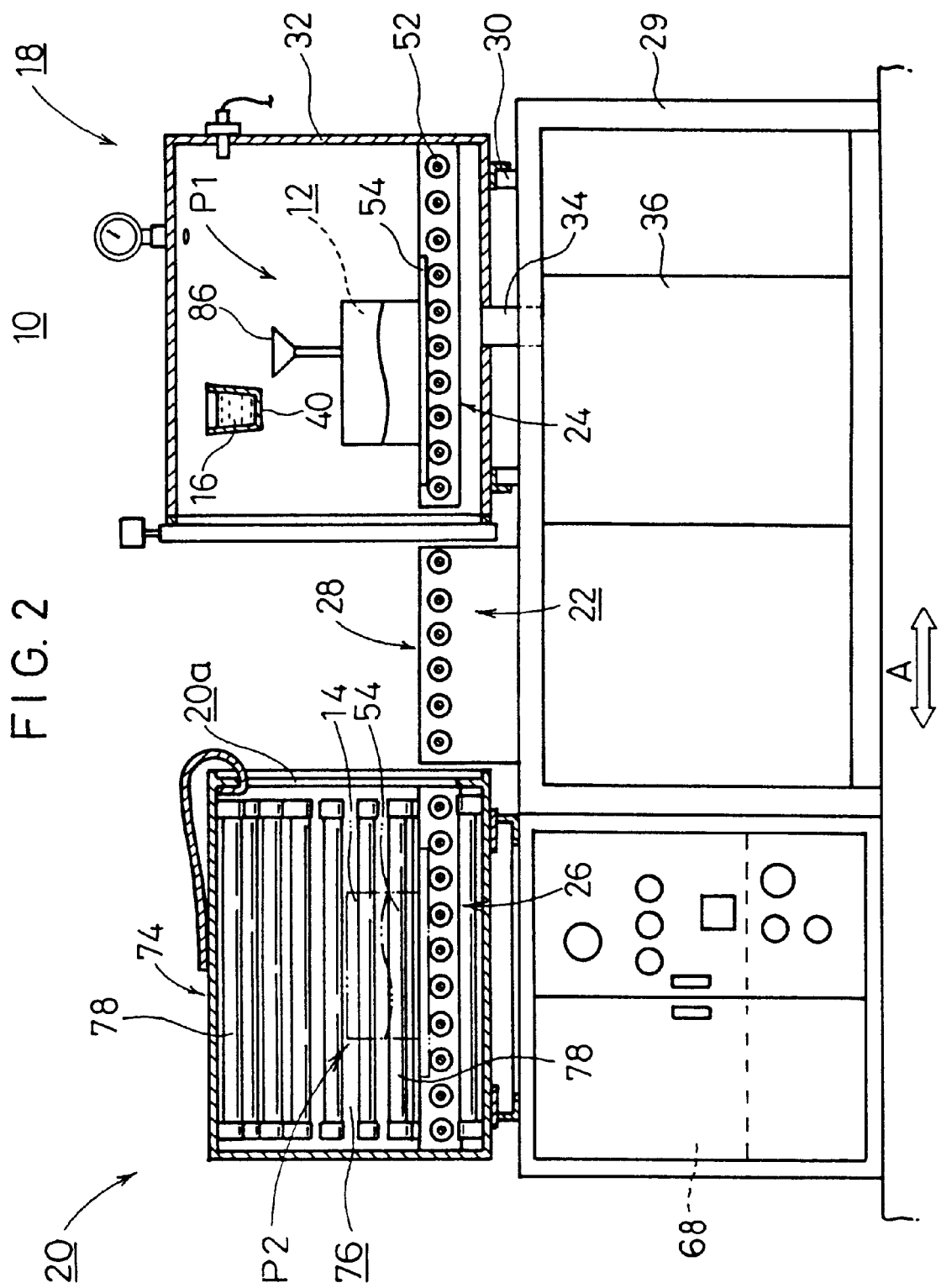
FIG. 2 is an explanatory vertical cross-sectional view showing a partial structure of the molding apparatus of FIG. 1.
Figure 3:
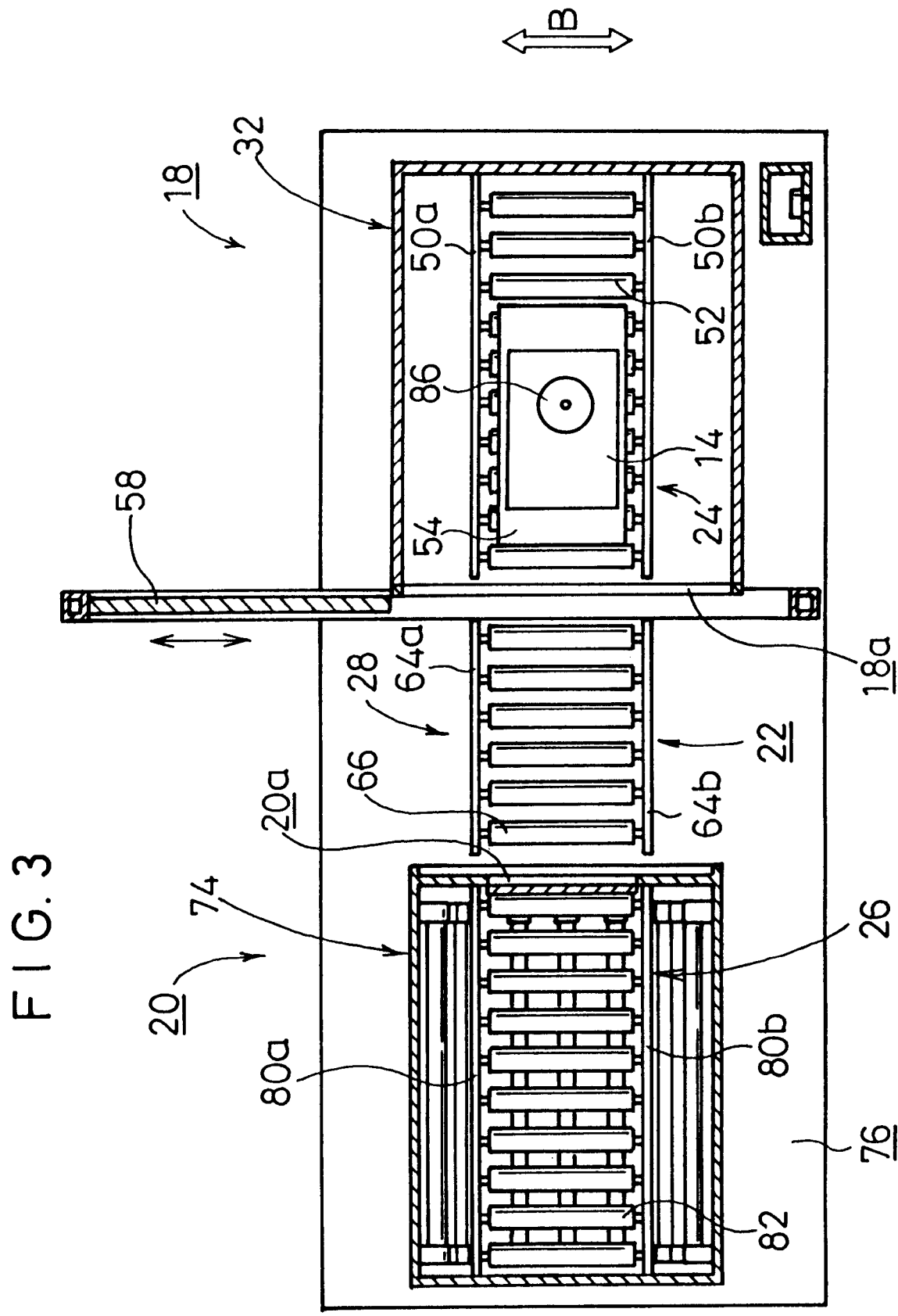
FIG. 3 is a partial plan view of the molding apparatus of FIG. 1.

FIG. 1 is an explanatory perspective view of a cast molding apparatus 10 according to the first embodiment of the present invention. FIG. 2 is a vertical cross-sectional view showing a structural element of the molding apparatus 10, and FIG. 3 is a partial plan view of the molding apparatus 10.

The molding apparatus 10 is equipped with a molding die 14 having a cavity 12 therein which corresponds in form with a product to be reproduced, a cast molding device 18 in which an ultraviolet curable liquid resin 16 is poured into the cavity 12 of the molding die 14, an ultraviolet light irradiating device 20 for irradiating the molding die 14 from the outside with ultraviolet rays for hardening the ultraviolet curable liquid resin in the interior of the molding die 14, and a transport mechanism 22 for transporting the molding die 14 between the cast molding device 18 and the ultraviolet light irradiating device 20. The molding die 14 itself is formed from an ultraviolet-cured silicon rubber material and may, for example, be divided into two upper and lower portions.

The transport mechanism 22 is made up of a first transport path 24 continuing from an infusion position P1 inside the cast molding device 18 to an inlet/outlet opening 18a of the cast molding device 18, a second transport path 26 continuing from an ultraviolet light irradiating position P2 inside the ultraviolet light irradiating device 20 to an inlet/outlet opening 20a of the ultraviolet light irradiating device 20, and a third transport path 28 which interconnects the first and second transport paths 24 and 26.

The cast molding device 18 comprises a foundation base 28, wherein a vacuum chamber 32 is supported on the foundation base 29 through a plurality of support legs 30. The vacuum chamber 32 is formed by a cylindrical body, closed on one end thereof, and which is disposed about a horizontally directed axis (along the direction of the arrow A). The interior of the vacuum chamber 32 communicates with a vacuum pump 36 through a pipe 34.

Figure 4:
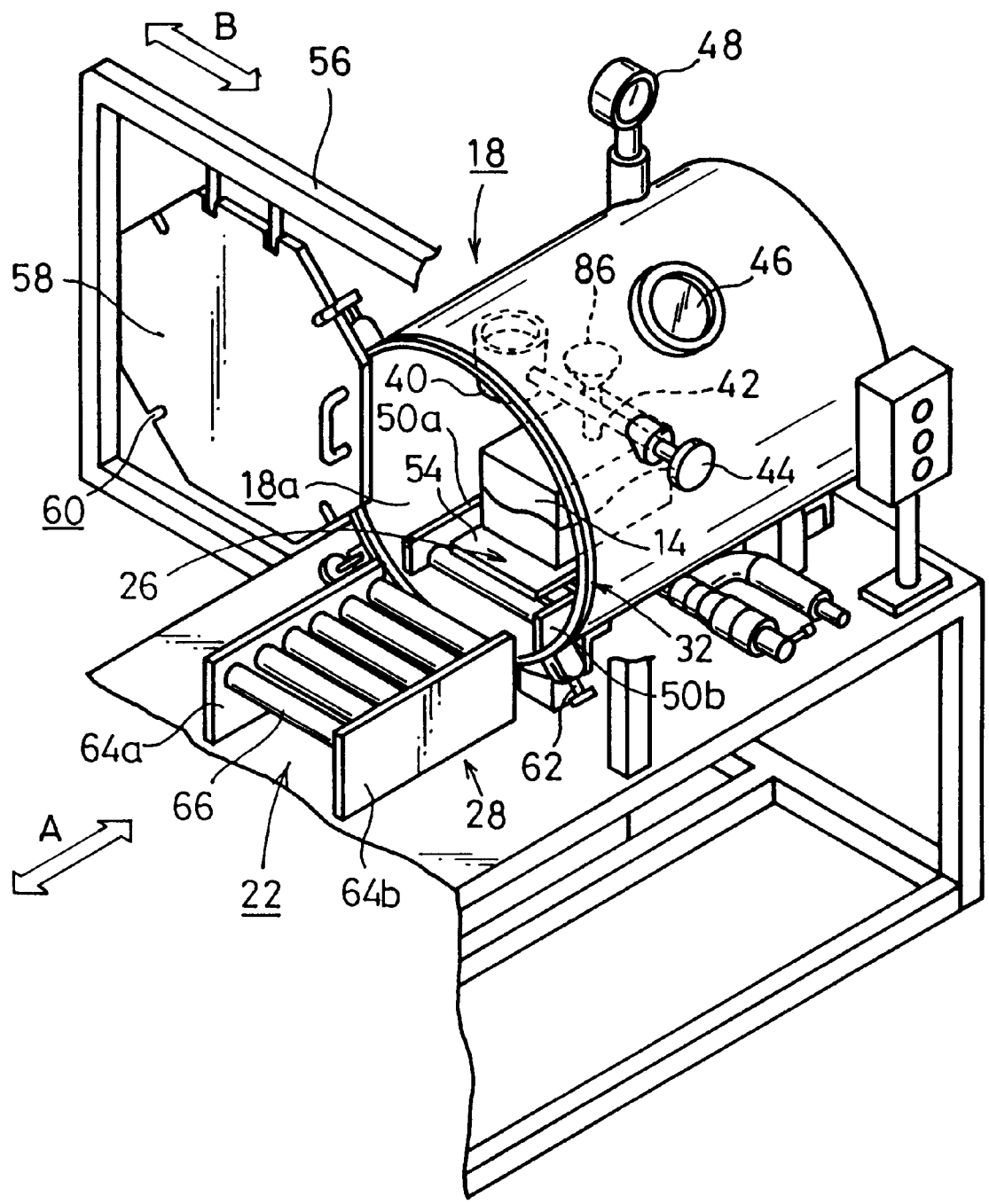
FIG. 4 is a partial perspective view of a cast molding device which makes up part of the molding apparatus.

A container 40 is disposed inside the vacuum chamber 32, which holds an ultraviolet curable liquid resin therein. As shown in FIG. 4, the container 40 is supported on the peripheral walls of the vacuum chamber 32 through a support rod 42, wherein the support rod 42 extends through to the outside of the vacuum chamber 32 and is coupled to a manipulating element 44. Hence, the container 40 is freely tiltable by means of the manipulating element 44. A viewing window 46 for permitting inspection of the interior of the vacuum chamber 32 is disposed on the peripheral wall of the vacuum chamber 32, together with a pressure meter 48 which is attached thereto for displaying the pressure in the vacuum chamber 32.

The first transport path 24 disposed inside the vacuum chamber 32 is provided with opposing side plates 50a, 50b which are separated by a fixed distance in a direction of the arrow B perpendicular to the direction of transport of the molding die 14, and wherein a plurality of rollers 52 are disposed extending in the direction of the arrow B between the side plates 50a, 50b, the rollers 52 being spaced from one another a predetermined distance in the direction of the arrow A. The molding die 14 is disposed for transport on the rollers by means of a transparent acrylic resin plate 54.

As shown in FIGS. 1 and 4, a frame 56 is disposed on the foundation base 29, wherein a transparent cover 58, made from an acrylic resin, is supported in the frame 56 for blocking the inlet/outlet opening 18b of the vacuum chamber 32. A plurality of recesses 60 are formed around the periphery of the cover 58, whereby latch rods 62 disposed on the vacuum chamber 36 are fitted into the recesses 60, so that the cover 58 hermetically seals the vacuum chamber 32.

The third transport path 28 which makes up part of the transport mechanism 22 is disposed on the foundation base 28. The third transport path 28, similarly to the first transport path 24, is constructed by opposing said plates 64a, 64b which are separated by a fixed distance in the direction of the arrow B. A plurality of rollers 66 are disposed between the side plates 64a, 64b and spaced from one another a predetermined distance in the direction of the arrow A. The rollers 66 are disposed contiguously and connectively to the rollers 52 of the first transport path 24, in the direction of the arrow A.

Figure 5:
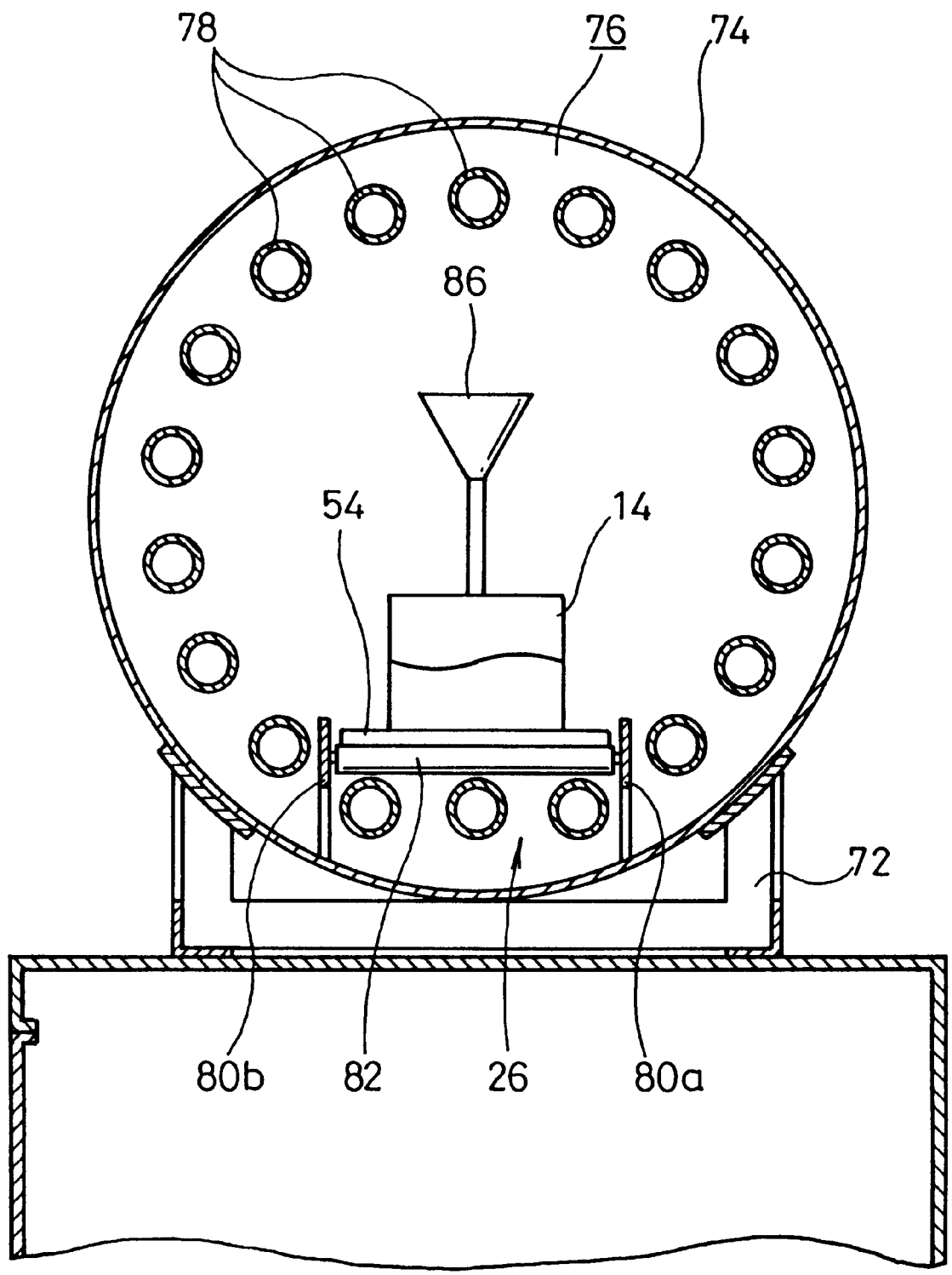
FIG. 5 is a partial vertical cross-sectional view showing an internal part of an ultraviolet light irradiating device which makes up part of the molding apparatus.

As shown in FIGS. 1 and 2, the ultraviolet light irradiating device 20 is equipped with a box 70 housing an internal power source 68, thereby forming a base, wherein a casing 74 is supported through supporting elements 72 atop the box 70. The casing 74 is of a bottomed cylindrical form having a horizontally directed axis, defining an ultraviolet light irradiation chamber 76 inside the casing 74. As shown in FIG. 5, a plurality of straight tubular ultraviolet lamps 78 are disposed in the ultraviolet light irradiation chamber 76, wherein the ultraviolet lamps 78 are disposed in a ring-like fashion around the circumference of the ultraviolet light irradiation chamber 76 and extending in the longitudinal direction thereof (in the direction of the arrow A). The wavelength of irradiation is selected to provide ultraviolet radiation in a range of 200 to 500 nm, and for example, between 200 and 380 nm.

A second transport path 26 is disposed inside the ultraviolet light irradiation chamber 76. As shown in FIGS. 3 and 5, the second transport path 26, similar to the first transport path, is constructed by opposing side walls 80a, 80b, with a plurality of rollers 82 disposed between the side walls 80a, 80b, wherein the rollers 82 make up a straight line transport path together with the rollers 52 and 66. As shown in FIG. 1, a flap-like door 84 is disposed at an inlet/outlet opening 20a of the casing 74 for blocking the opening.

Figure 6:
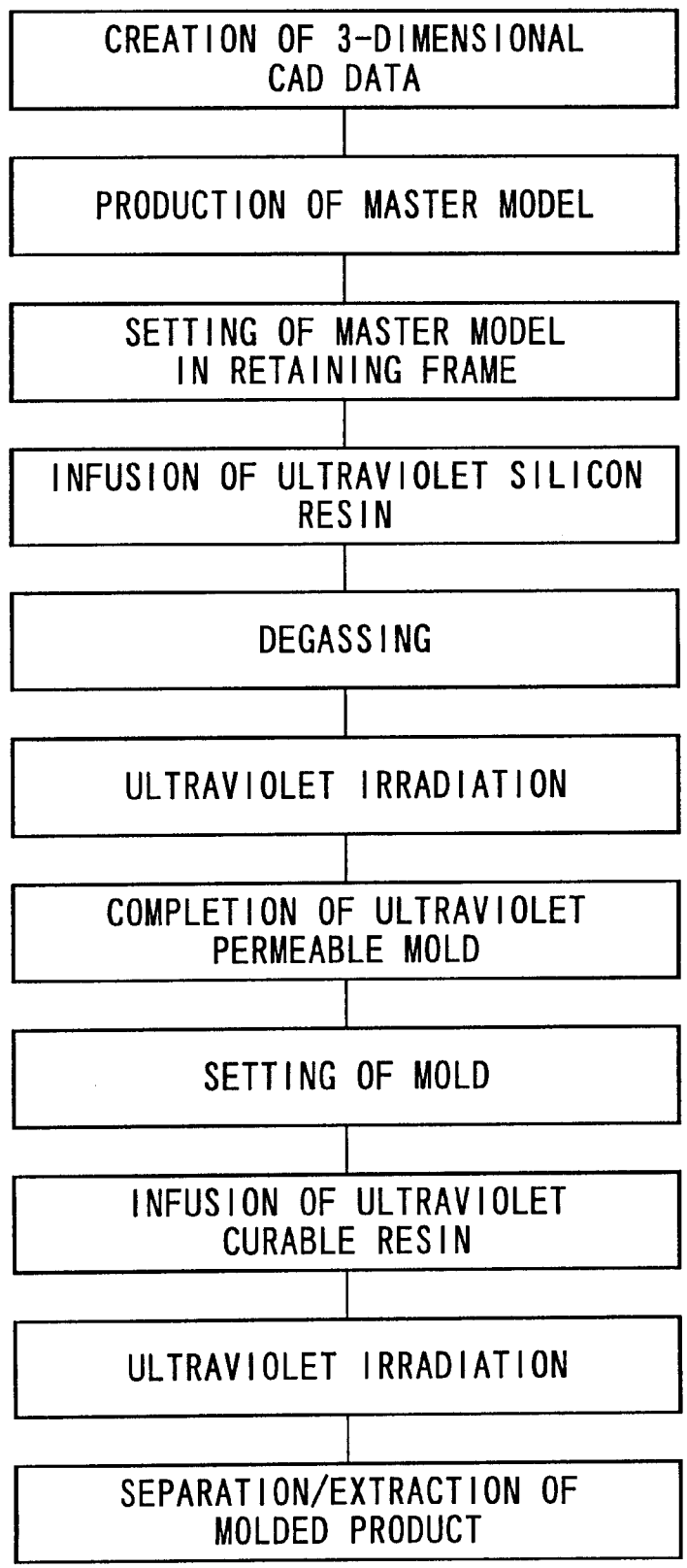
FIG. 6 is a flow chart describing a molding process performed using the molding apparatus.

A method of producing the molding die 14 itself, and subsequent method of obtaining a formed product employing such a molding die 14, using the apparatus according to the first embodiment of the invention constructed as described above, shall now be explained with reference to FIG. 6.

First, CAD data of a master model is created using a three-dimensional CAD system, and based on such data the master model is produced using a laser carving device. Next, a box-shaped retaining mold (not shown), having an upper opening, is constructed from transparent acrylic resin plates, and the master model is set in position inside the retaining mold. The retaining mold is arranged inside the vacuum chamber 32 on the transparent plate 54, and an ultraviolet curable silicon resin is then poured into the retaining mold.

After degassing in the vacuum chamber 32, the transparent plate 54 supporting the retaining frame is passed from the first transport path 24 to the third transport path 28 and arranged inside the ultraviolet light irradiation chamber 76. Ultraviolet lamps 78 are energized and ultraviolet irradiation is conducted, thereby hardening the silicon resin in the retaining mold. Creation of a transparent silicon resin molding die 14 is completed once the master model has been removed from inside the hardened silicon resin, which can be done, for example, by separating the molding die into upper and lower halves and extracting the master model therefrom.

Next, the transparent molding die 14 is placed on the transparent plate 54 and is arranged at an infusion position P1 inside of the vacuum chamber 32 by transferring it from the third transport path 28 to the first transport path 24. Once the molding die 14 is placed in position, the cover 58 is moved over the inlet/outlet opening 18a of the vacuum chamber 32, wherein the cover 58 blocks the opening 18a and, by means of the latch rods 62, hermetically seals the vacuum chamber 32. In this condition, under operation of the vacuum pump 36, air is drawn out from the interior of the vacuum chamber 32. Then, the handle 44 is manipulated, tilting the container 40, so that the ultraviolet curable liquid resin in the container is poured into the cavity 12 inside of the molding die 14. At this time, a funnel 86 may be inserted into an inlet opening of the molding die, for facilitating infusion of the liquid resin into the cavity 12.

After infusion of the resin into the molding die 14, the interior of the vacuum chamber 32 is restored to atmospheric pressure, and the cover 58 is separated from the inlet/outlet opening 18a. Further, the molding die 14 is delivered integrally with the transparent plate 54 to the second transport path 26 via the first and third transport paths 24, 28 and arranged at an ultraviolet light irradiating position P2 inside the ultraviolet light irradiation chamber 76. Next, in a condition in which the inlet/outlet opening 20a is shut by the flap 84, the ultraviolet lamps 78 are energized by the power source 68, and the ultraviolet curable liquid resin 16 inside the cavity 12 is irradiated with ultraviolet light from an outer side of the molding die 14. Once the ultraviolet curable liquid resin has hardened, the flap 84 is opened, and the molding die 14 is drawn out along the second transport path 28, integrally with the transparent plate 54, to the third transport path 28, where the molding die 14 can be separated and the finished product removed therefrom.

In this case, according to the first embodiment, a transport mechanism 22 is disposed between the cast molding device 18 and the ultraviolet light irradiating device 20 for transferring the molding die 14 therebetween, wherein the transport mechanism 22 is equipped with a first transport path 24 which continues from an infusion position P1 in the cast molding device 18 to the inlet/outlet opening 18*a* thereof, a second transport path 26 which continues from an ultraviolet light irradiating position P2 inside the ultraviolet light irradiating device 20 to the inlet/outlet opening 20*a* thereof, and a third transport path 28 connecting between the first and second transport paths 24 and 26.

As a result, after the molding die 14 has been arranged at an infusion position P1 and infusion performed, and the molding die 14 is arranged at an ultraviolet light irradiating position P2 where ultraviolet irradiation is performed, and further, when extraction of the molded product is performed by means of the third transport path 28, it is only necessary that the molding die 14, integrally with the transparent plate 54, be slid along the respective first through third transport paths 24, 26 and 28. Accordingly, an effect is achieved in that operations for transferring the molding die 14 between various positions can be easily and swiftly accomplished in a single step.

Figure 7:
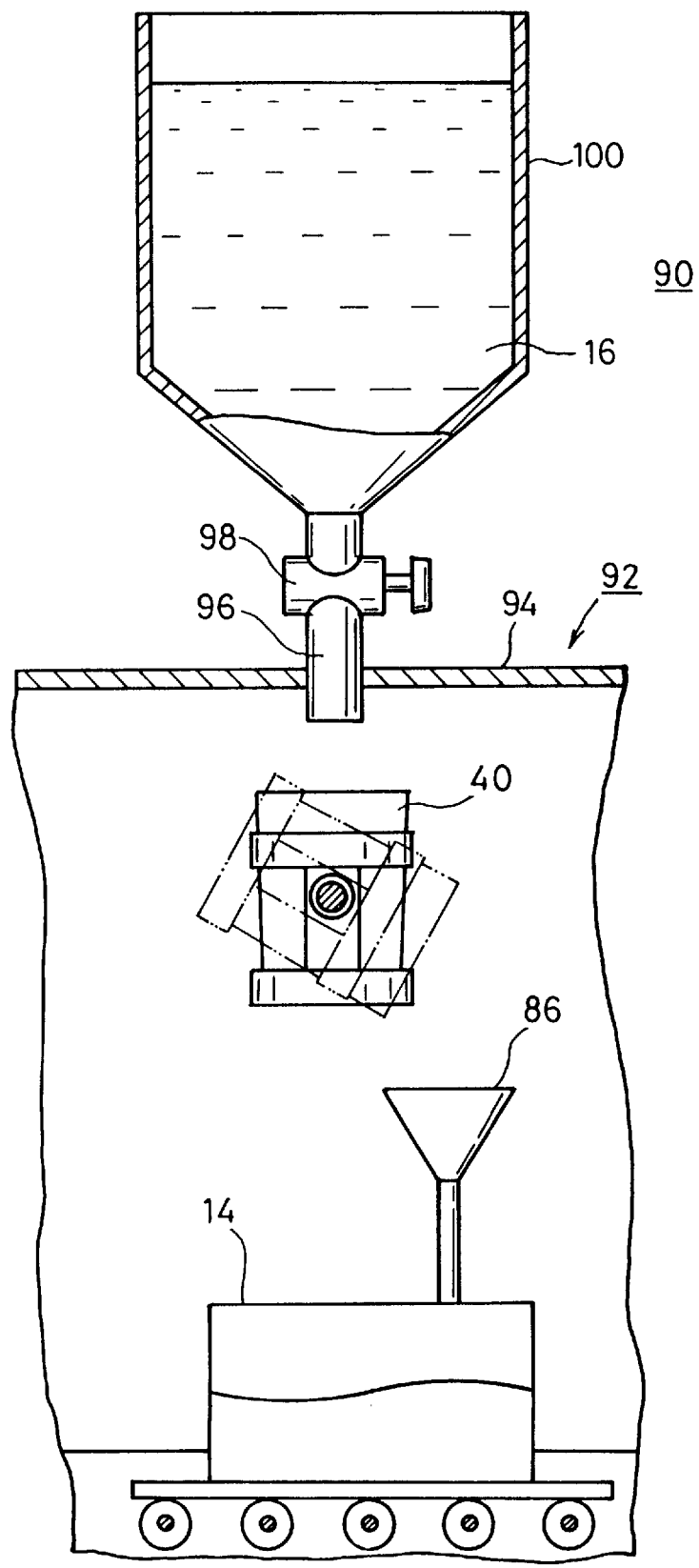
FIG. 7 is an explanatory partial cross-sectional view of a cast molding apparatus according to a second embodiment of the present invention.

FIG. 7 is a partial explanatory view of a cast molding device 92 which makes up part of the cast molding apparatus 90 according to the second embodiment of the present invention. Structural elements which are the same as those present in the first embodiment are designated by like reference numerals, and detailed explanation thereof shall be omitted.

On an upper part of a vacuum chamber 94 making up the cast molding device 92, a supply pipe 96 is connected for pouring an ultraviolet curable liquid resin 16 into the container 40. The supply pipe 96 communicates with a reservoir tank 100 via an opening/closing valve 98, wherein the ultraviolet curable liquid resin inside the reservoir tank 100 is delivered to the container 40 via the supply pipe 96 by opening the valve 98.

In this manner, according to the second embodiment, an operation for supplying the ultraviolet curable liquid resin 16 to the inside of the container 40 is swiftly and easily accomplished by opening the valve 98. Accordingly, compared with an operator entering directly into the vacuum chamber 94 and manually pouring the liquid resin into the container 40, the pouring operation described above attains the advantage of enabling it to be efficiently performed in one step and in a short time period.

FIG. 8 is an outline descriptive view of a cast molding device 110 which makes up part of the cast molding apparatus 110 according to the third embodiment. Structural elements which also appear in the second embodiment are indicated with like reference numerals, and detailed description thereof is omitted.

In the cast molding device 110, a pump 112 is disposed at an intervening location between the supply pipe 96 and the reservoir tank 100, which is constructed such that the ultraviolet curable liquid resin 16 in the reservoir tank 100 is fed under pressure to the supply pipe 96 under action of the pump 112. Accordingly, an effect exists in that a pouring operation for delivering the liquid resin to the container 40 can be more swiftly accomplished.

Figure 9A:
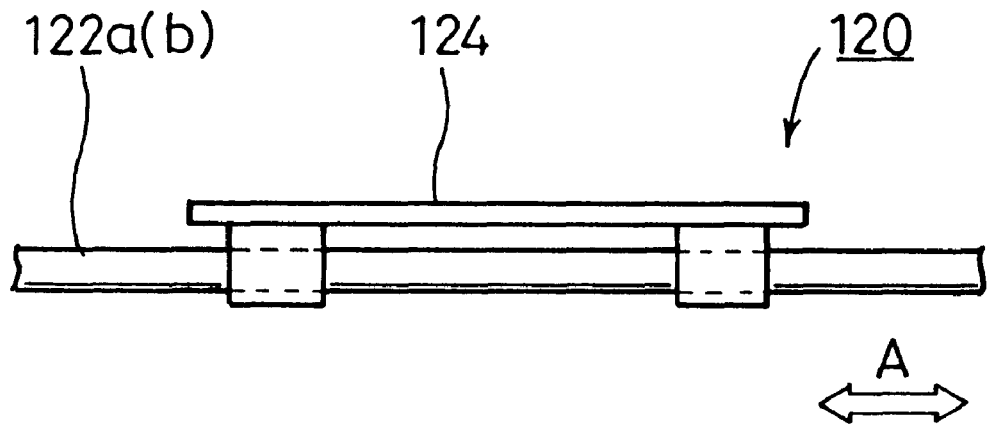
FIG. 9A is a partial frontal view of a transport mechanism which forms part of the cast molding apparatus according to a fourth embodiment of the present invention.
Figure 9B:
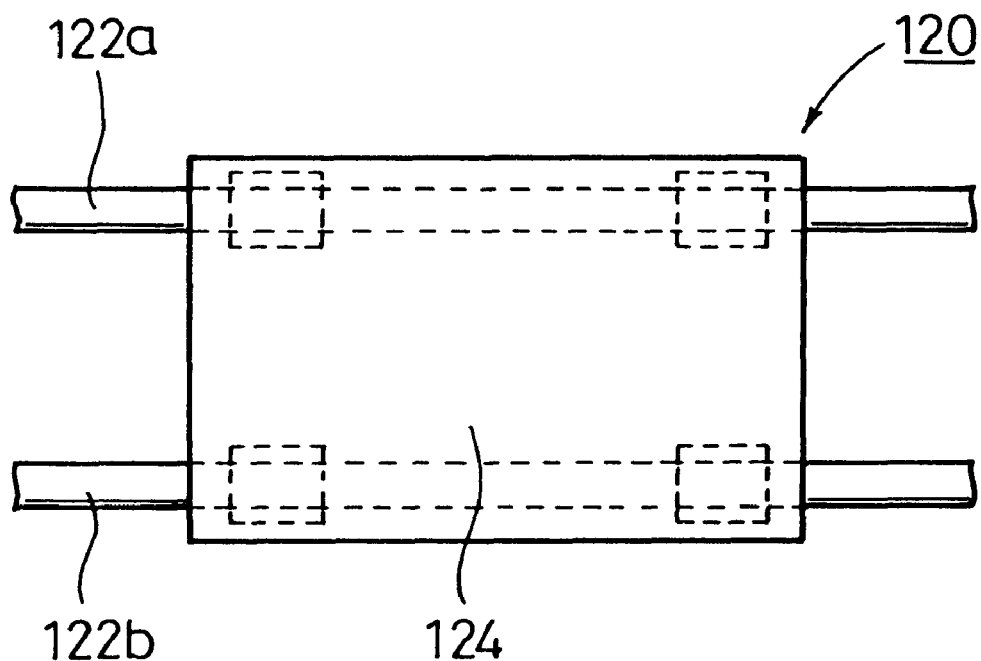
FIG. 9B is a partial plan view of the transport mechanism shown in FIG. 9A.

FIGS. 9A and 9B illustrate a transport mechanism 120 making up part of the cast molding apparatus according to the fourth embodiment of the present invention. The transport mechanism 120 comprises opposing rails 122*a*, 122*b* which extend in parallel along the direction of the arrow A, together with a slider 124 which glides upon the rails 122*a*, 122*b*. In practice, the slider 124 is formed from a transparent acrylic resin in the same manner as the transparent plate 54. Accordingly, the transport mechanism 120 provides the same functions as the transport mechanism 22 according to the first embodiment.

Figure 10:
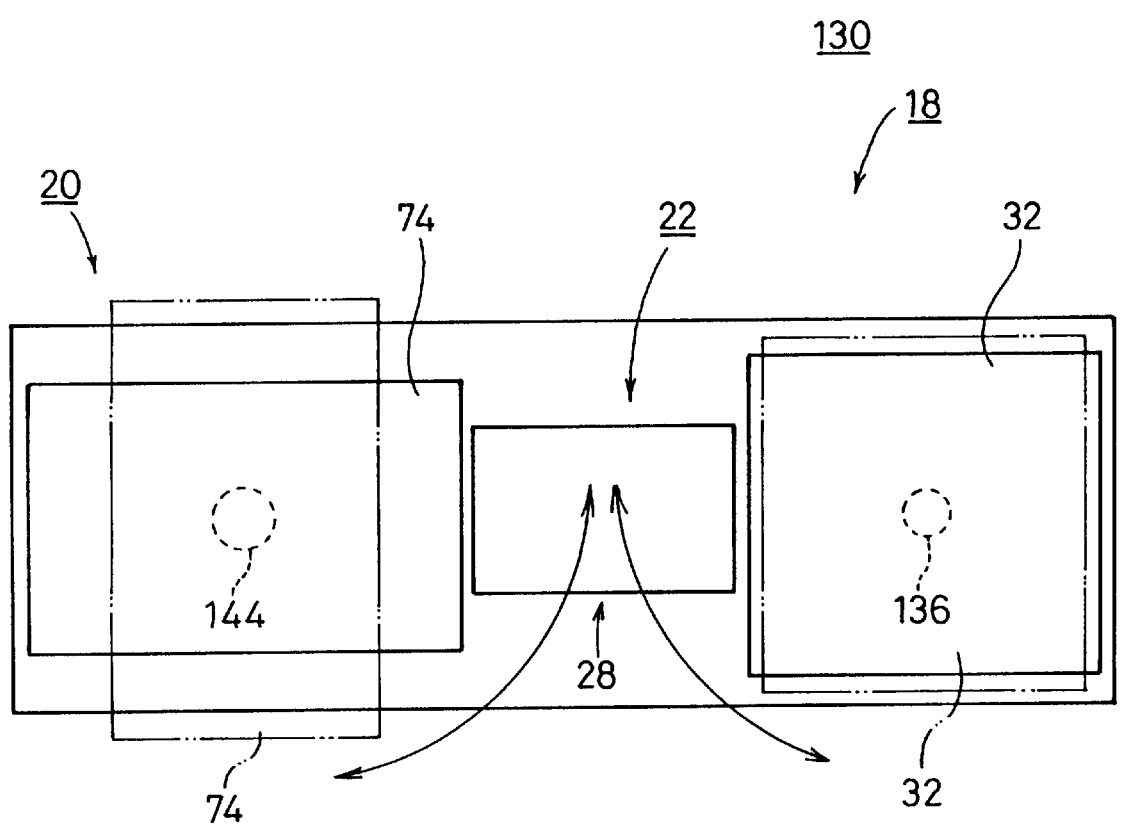
FIG. 10 is an explanatory plan view showing a portion of a cast molding apparatus according to a fifth embodiment of the present invention.
Figure 11:
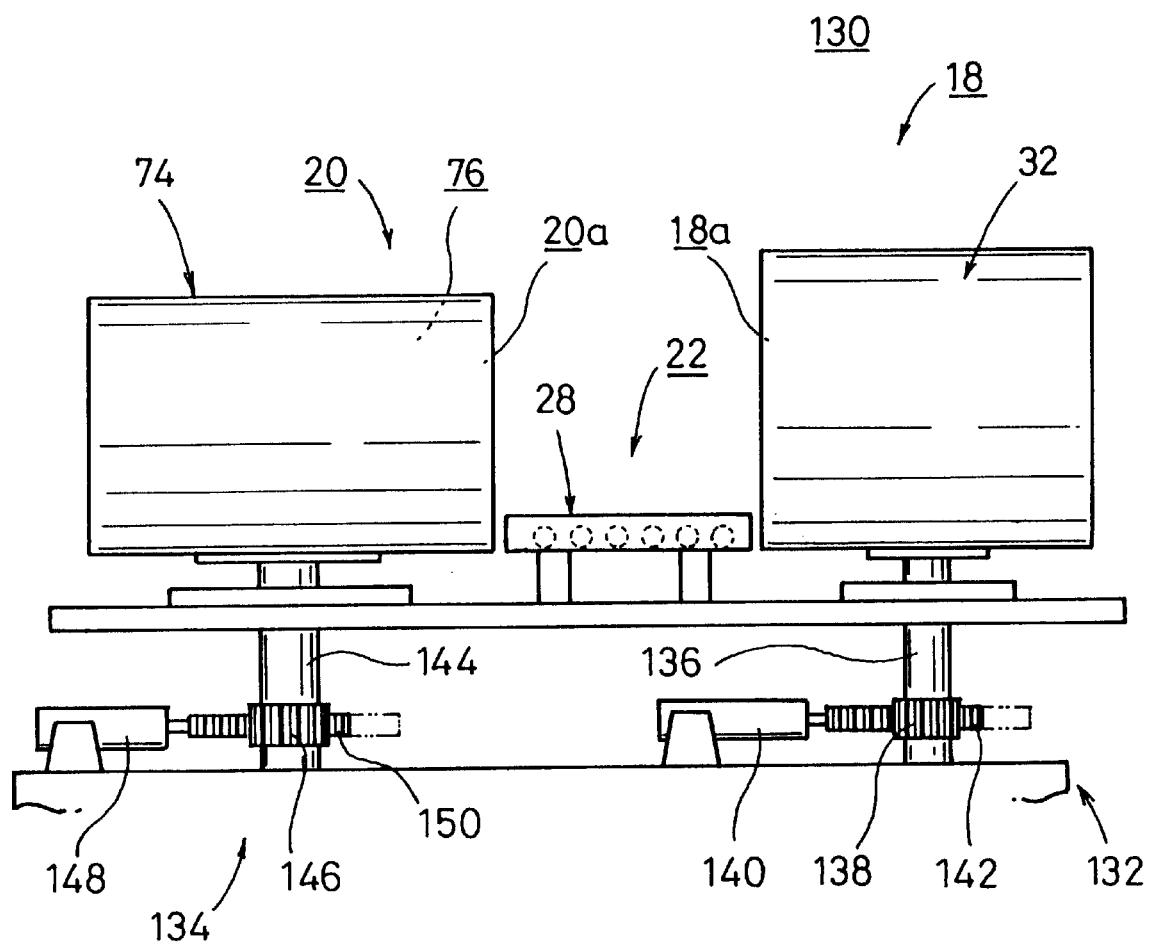
FIG. 11 is a partial frontal view of the molding apparatus illustrated in FIG. 10.

FIGS. 10 and 11 show a cast molding apparatus 130 according to the fifth embodiment of the present invention. Structural features which are also present in the molding apparatus of the first embodiment are indicated with like reference numerals, and detailed description of such elements is omitted.

The molding apparatus 130 comprises a vacuum chamber drive means 132 for enabling clockwise and counterclockwise rotation of the vacuum chamber 32 making up the cast molding device 18 about a vertical axis through a range of 90° for example, and an ultraviolet irradiation chamber drive means 134 for enabling clockwise and counterclockwise rotation of the casing 74 making up the ultraviolet irradiating device 20 about a vertical axis through a range of 90° for example.

The vacuum chamber 32 is supported on a first vertically directed rotating axis 136, wherein a pinion 138 is integrally disposed on the first rotating axis 136. A rack 142 which extends horizontally and is connected with a first cylinder 140 is enmeshed with the pinion 138. The casing 74 is supported on a second vertically extending rotating axis 144. A pinion 146 is disposed on the second rotating axis 134, wherein a rack 150 which progresses in a horizontal direction via a second cylinder 148 is enmeshed with the pinion 146.

In the fifth embodiment of the invention constructed in this manner, under a driving action of the first cylinder 140, the first rotating axis 136 together with the vacuum chamber 32 are integrally rotated 90° by means of the rack 142 and pinion 138, whereby the inlet/outlet opening 18*a* is arranged to face frontally. As a result, the inlet/outlet opening 18*a* becomes arranged to face toward an operator, wherein the molding die 14 can be more easily positioned inside the vacuum chamber 32.

On the other hand, under a driving action of the second cylinder 148, the second rotating axis 144 together with the casing 74 are integrally rotated 90° by means of the rack 150 and pinion 146. Accordingly, the inlet/outlet opening 20*a* is arranged to face toward an operator, so that after ultraviolet irradiation, the molding die 14 can be easily taken out from the ultraviolet light irradiation chamber 76. As a result, an effect is attained whereby handling of the molding die 14 is facilitated.

Figure 12:
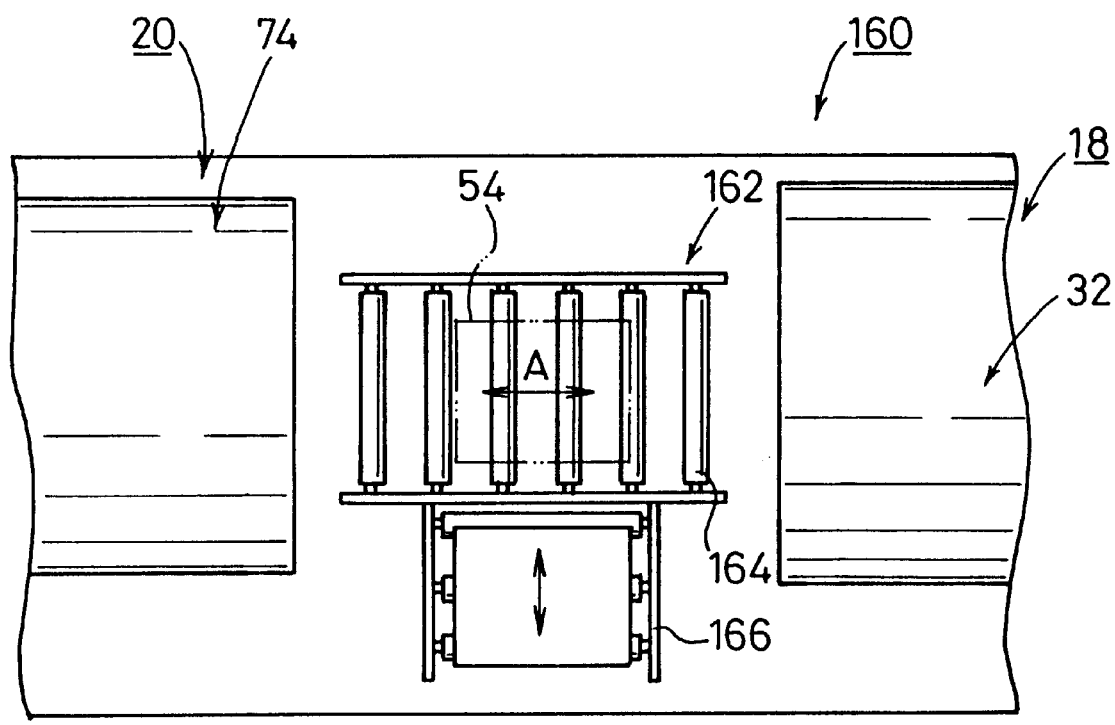
FIG. 12 is a partial plan view of a transport apparatus which makes up part of the cast molding apparatus according to a sixth embodiment of the present invention.

FIG. 12 shows a transport mechanism 160 which makes up part of the cast molding apparatus according to the sixth embodiment of the present invention. The third transport path 162 of the transport mechanism 160 is equipped with a main transport path 164 disposed to extend in a left-right direction (direction of the arrow A) between the cast molding device 18 and the ultraviolet light irradiating device 20, and an auxiliary transport path 166 disposed so as to extend in a direction perpendicular to the main transport path 164.

In this manner, the third transport path 162 has a T-shaped plan view, wherein the auxiliary transport path 166 is disposed so as to correspond with the front facing position of an operator. As a result, the operator can perform both delivery and collection operations on the molding die 14 through the auxiliary transport path 166, further facilitating handling of the molding die 14.

Figure 13:
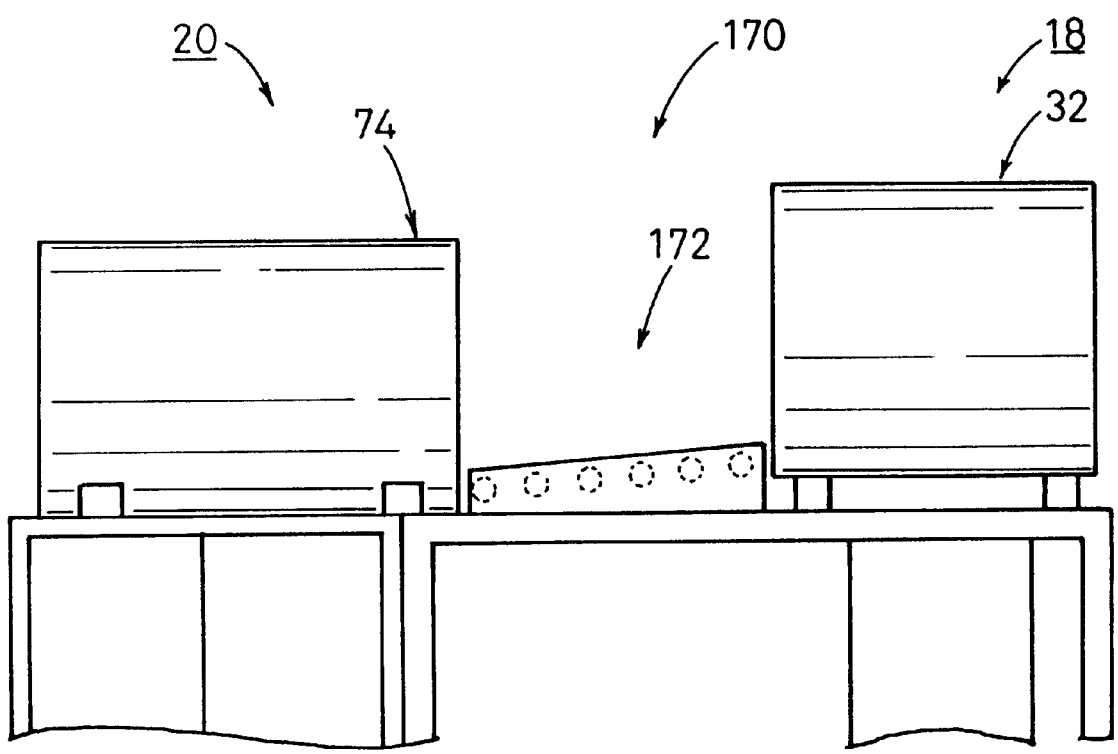
FIG. 13 is a partial frontal view of the transport path which makes up part of the cast molding apparatus according to a seventh embodiment of the present invention.

FIG. 13 illustrates a transport mechanism 170 which makes up part of the molding apparatus according to the seventh embodiment of the present invention. The third transport path 172 of the transport mechanism 170 is slanted in a downward direction from the cast molding device 18 toward the ultraviolet irradiating device 20. Accordingly, an advantage is attained wherein the operation for transferring the molding die after infusion from the cast molding device 18 to the ultraviolet light irradiating device 20 can be more easily carried out.

What is claimed is:

1. A cast molding apparatus, comprising:
   a molding die having a cavity therein which corresponds to the outer shape of a product to be produced;
   a cast molding device for charging an ultraviolet curable liquid resin, curable by exposure to ultraviolet rays, into the cavity of said molding die, said cast molding device comprising a cast molding chamber having an access opening;
   an ultraviolet ray irradiating device for irradiating ultraviolet light from an outside of said molding die, thereby hardening said ultraviolet curable liquid resin in the interior of said molding die, said ultraviolet ray irradiating device comprising an ultraviolet light irradiation chamber having an access opening; and
   a transport mechanism for conveying said molding die between said cast molding device and said ultraviolet ray irradiating device,
   wherein at least one of said cast molding chamber and said ultraviolet light irradiation chamber is rotatable about a substantially vertical axis for changing a position of the access opening thereof.

2. The cast molding apparatus according to claim 1, wherein said cast molding device accommodates said molding die therein, and said cast molding chamber further comprising a vacuum chamber for enabling infusion of said ultraviolet curable liquid resin under a low pressure.

3. The cast molding apparatus according to claim 2, wherein said vacuum chamber includes a container which accommodates therein said ultraviolet curable liquid resin, further comprising an operative member extending to the outside of said vacuum chamber for tilting said container to pour said ultraviolet curable liquid resin into a funnel connected with said molding die.

4. The cast molding apparatus according to claim 3, further comprising a supply conduit connected to an upper part of said vacuum chamber through which said ultraviolet curable liquid resin is poured into said container.

5. The cast molding apparatus according to claim 4, wherein said supply conduit is connected to a reservoir tank via a pump.

6. The cast molding apparatus according to claim 2, further comprising a vacuum chamber driving means for enabling said vacuum chamber to be rotated in both clockwise and counter-clockwise directions about a vertical axis.

7. The cast molding apparatus according to claim 1, wherein said ultraviolet light irradiation chamber houses therein an ultraviolet lamp, and further comprising an ultraviolet light irradiation chamber driving means for enabling said irradiation chamber to be rotated in both clockwise and counter-clockwise directions about a vertical axis.

8. The cast molding apparatus according to claim 7, wherein said ultraviolet light irradiation chamber comprises a cylindrical housing disposed about a horizontal axis thereof, and further wherein said ultraviolet lamp comprises a plurality of straight tubular lamps disposed circumferentially along a longitudinal direction of said irradiation chamber.

9. The cast molding apparatus according to claim 1, wherein said transport mechanism comprises:
   a first transport path continuing from an infusion position inside said cast molding device to an inlet/outlet opening of said cast molding device;
   a second transport path continuing from an ultraviolet light irradiation position inside said ultraviolet light irradiating device to an inlet/outlet opening of said ultraviolet light irradiating device; and
   a third transport path connecting said first and second transport paths.

10. The cast molding apparatus according to claim 9, wherein said third transport path comprises:
    a main transport path extending in left and right directions between said cast molding device and said ultraviolet light irradiating device; and
    an auxiliary transport path extending toward a frontal side, perpendicularly to said main transport path.

11. The cast molding apparatus according to claim 9, wherein said third transport path is slanted downwardly from said cast molding device toward said ultraviolet light irradiating device.

12. The cast molding apparatus according to claim 9, said transport mechanism further comprising a transparent plate transported along said first, second and third transport paths and supporting said molding die.

13. A cast molding apparatus comprising:
    a molding die having a cavity therein which corresponds to the outer shape of a product to be produced;
    a cast molding device for charging an ultraviolet curable liquid resin, curable by exposure to ultraviolet rays, into the cavity of said molding die;
    an ultraviolet ray irradiating device comprising an ultraviolet light irradiation chamber for irradiating ultraviolet light from an outside of said molding die, thereby hardening said ultraviolet curable liquid resin in the interior of said molding die; and
    a transport mechanism for conveying said molding die between said cast molding device and said ultraviolet ray irradiating device,
    wherein said ultraviolet light irradiation chamber comprises a cylindrical housing disposed about a horizontal axis thereof, and containing an ultraviolet lamp comprising a plurality of straight tubular lamps disposed circumferentially along a longitudinal direction of said irradiation chamber.

14. A cast molding apparatus comprising:
    a molding die having a cavity therein which corresponds to the outer shape of a product to be produced;
    a cast molding device for charging an ultraviolet curable liquid resin, curable by exposure to ultraviolet rays, into the cavity of said molding die;
    an ultraviolet ray irradiating device for irradiating ultraviolet light from an outside of said molding die, thereby hardening said ultraviolet curable liquid resin in the interior of said molding die; and
    a transport mechanism for conveying said molding die between said cast molding device and said ultraviolet ray irradiating device, wherein said transport mechanism comprises a first transport path continuing from an infusion position inside said cast molding device to an inlet/outlet opening of said cast molding device, a second transport path continuing from an ultraviolet light irradiation position inside said ultraviolet light irradiating device to an inlet/outlet opening of said ultraviolet light irradiating device, and a third transport path connecting said first and second transport paths, said third transport path comprising a main transport path extending in left and right directions between said cast molding device and said ultraviolet light irradiating device, and an auxiliary transport path extending toward a frontal side perpendicularly to said main transport path.

15. A cast molding apparatus comprising:

a molding die having a cavity therein which corresponds to the outer shape of a product to be produced;

a cast molding device for charging an ultraviolet curable liquid resin, curable by exposure to ultraviolet rays, into the cavity of said molding die;

an ultraviolet ray irradiating device for irradiating ultraviolet light from an outside of said molding die, thereby hardening said ultraviolet curable liquid resin in the interior of said molding die; and a transport mechanism for conveying said molding die between said cast molding device and said ultraviolet ray irradiating device, wherein said transport mechanism comprises a first transport path continuing from an infusion position inside said cast molding device to an inlet/outlet opening of said cast molding device, a second transport path continuing from an ultraviolet light irradiation position inside said ultraviolet light irradiating device to an inlet/outlet opening of said ultraviolet light irradiating device, and a third transport path connecting said first and second transport paths which is slanted downwardly from said cast molding device toward said ultraviolet light irradiating device.

16. A cast molding apparatus comprising:

a molding die having a cavity therein which corresponds to the outer shape of a product to be produced;

a cast molding device for charging an ultraviolet curable liquid resin, curable by exposure to ultraviolet rays, into the cavity of said molding die;

an ultraviolet ray irradiating device for irradiating ultraviolet light from an outside of said molding die, thereby hardening said ultraviolet curable liquid resin in the interior of said molding die;

a transport mechanism for conveying said molding die between said cast molding device and said ultraviolet ray irradiating device, wherein said transport mechanism comprises a first transport path continuing from an infusion position inside said cast molding device to an inlet/outlet opening of said cast molding device, a second transport path continuing from an ultraviolet light irradiation position inside said ultraviolet light irradiating device to an inlet/outlet opening of said ultraviolet light irradiating device, a third transport path connecting said first and second transport paths, and a transparent plate supporting said molding die and transported along said first, second and third transport paths.

* * * * *